(12) United States Patent
Hsu (10) Patent No.: US 8,382,328 B2
(45) Date of Patent: Feb. 26, 2013

(54) LIGHTING DEVICE HAVING FULLY DEVELOPED LIGHTING EFFECT

(75) Inventor: Kevin Hsu, Taichung (TW)

(73) Assignee: Dong Guan Bright Yinhuey Lighting Co., Ltd. China, Guang Dong (CN)

(*) Notice: Subject to any disclaimer, the term of this patent is extended or adjusted under 35 U.S.C. 154(b) by 272 days.

(21) Appl. No.: 12/833,163

(22) Filed: Jul. 9, 2010

(65) Prior Publication Data

US 2011/0194288 A1 Aug. 11, 2011

(30) Foreign Application Priority Data

Feb. 8, 2010 (CN) ...................... 2010 2 0116283 U (51) Int. Cl.
*F21S 8/00* (2006.01)
(52) U.S. Cl. ................... 362/277; 362/282; 362/311.01; 362/319; 362/326
(58) Field of Classification Search .......... 362/277–278, 362/282, 311.01, 311.03, 319, 326, 341
See application file for complete search history.

(56) References Cited

U.S. PATENT DOCUMENTS

2009/0027895 A1* 1/2009 Daimon et al. ............... 362/311

* cited by examiner

*Primary Examiner* — Meghan Dunwiddie
(74) *Attorney, Agent, or Firm* — Alan Kamrath; Kamrath IP Lawfirm, PA (57) ABSTRACT

A lighting device includes an optical lens, a scattering layer mounted on an outer surface of the optical lens, and a lighting module mounted on the optical lens and emitting a plurality light beams which are reflected and/or refracted by the optical lens and are reflected and/or refracted by the scattering layer. Thus, the light beams of the lighting module are initially reflected and/or refracted by the optical lens and are then reflected and/or refracted by the scattering layer so that the light beams of the lighting module are distributed in a two-stage manner by the optical lens and the scattering layer and are scattered and diverged in different angles and directions evenly and smoothly so as to provide a fully developed lighting effect, thereby enhancing the lighting efficiency of the lighting device.

13 Claims, 8 Drawing Sheets

FIG.13
PRIRO ART

LIGHTING DEVICE HAVING FULLY DEVELOPED LIGHTING EFFECT

BACKGROUND OF THE INVENTION

1. Field of the Invention

The present invention relates to an illuminating appliance and, more particularly, to a lighting device, such as an electric bulb or an LED (light emitting diode) lamp.

2. Description of the Related Art

Figure 12:
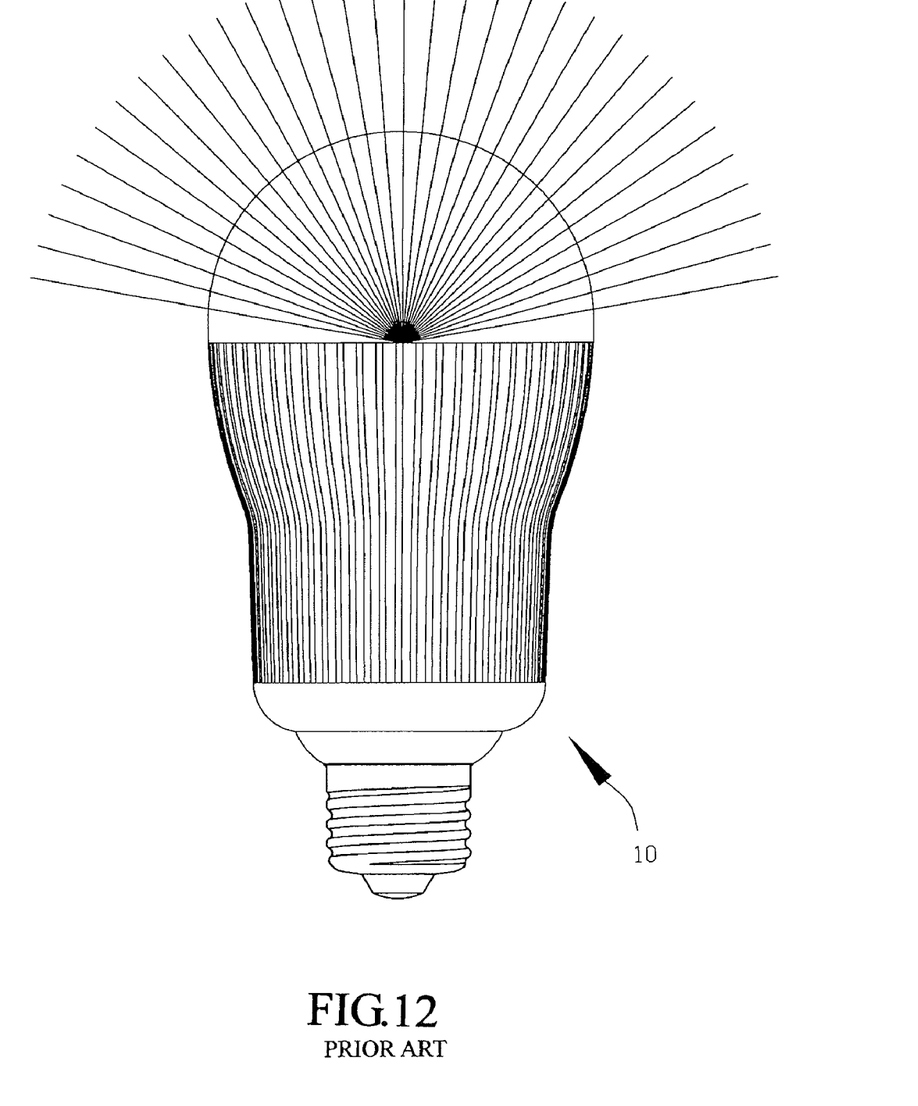
FIG. 12 is a front cross-sectional view of a conventional lighting device in accordance with the prior art.

A conventional energy-saving electric bulb 10 in accordance with the prior art shown in FIG. 12 comprises a light emitting member that can emit light beams outward to provide an illuminating effect. However, the light emitting member of the electric bulb 10 has a smaller lighting angle (the maximum lighting angle is about 120 degrees), thereby decreasing the lighting effect of the electric bulb 10.

Figure 13:
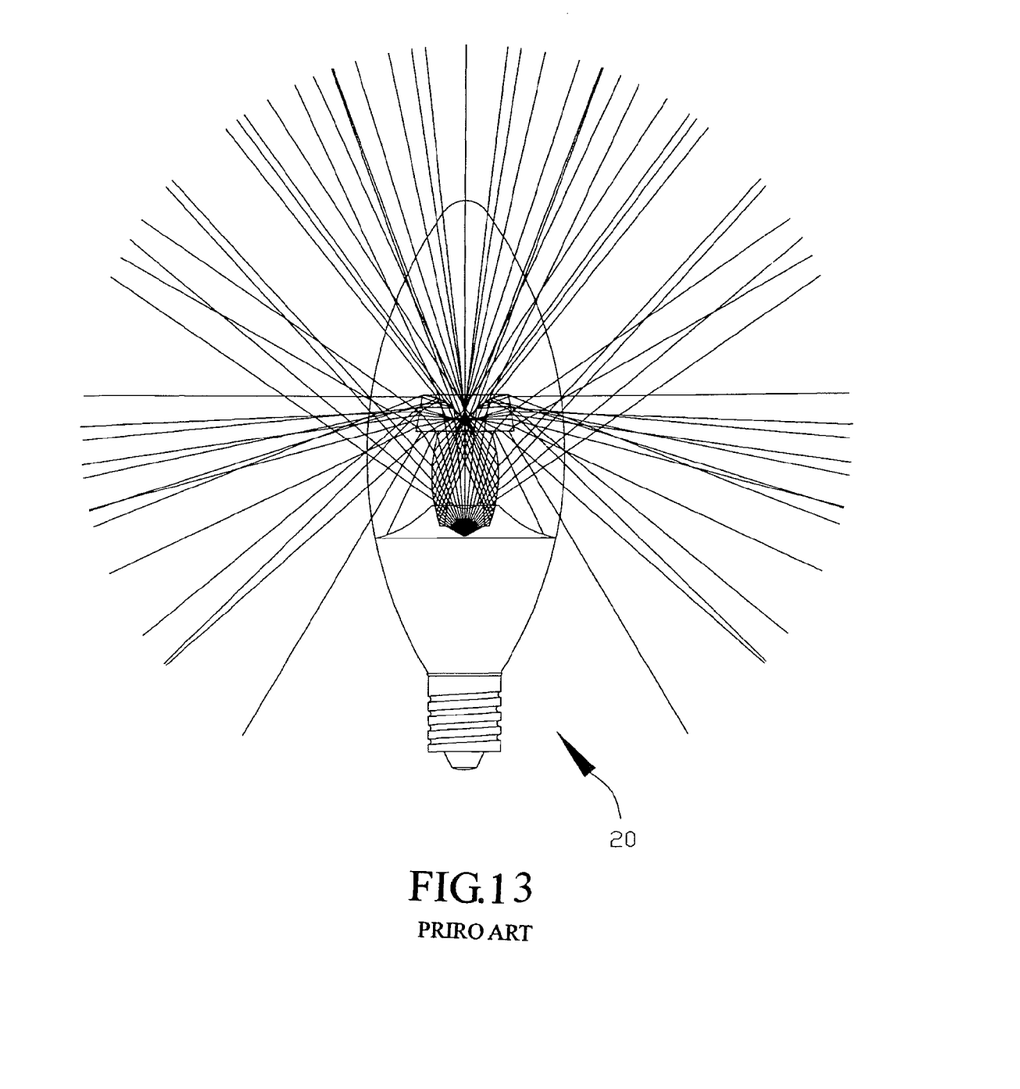
FIG. 13 is a front cross-sectional view of another conventional lighting device in accordance with the prior art.

Another conventional energy-saving electric bulb 20 in accordance with the prior art shown in FIG. 13 comprises a light emitting member that can emit light beams outward to provide an illuminating effect. However, the light beams emitted by the light emitting member of the electric bulb 20 are not distributed evenly and smoothly, thereby decreasing the lighting effect of the electric bulb 20 and thereby decreasing the aesthetic quality of the electric bulb 20.

BRIEF SUMMARY OF THE INVENTION

In accordance with the present invention, there is provided a lighting device, comprising an optical lens, a scattering layer mounted on an outer surface of the optical lens, and a lighting module mounted on the optical lens and emitting a plurality light beams which are reflected and/or refracted by the optical lens and are reflected and/or refracted by the scattering layer.

The primary objective of the present invention is to provide a lighting device having a fully developed lighting effect.

According to the primary advantage of the present invention, the light beams of the lighting module are initially reflected and/or refracted by the optical lens and are then reflected and/or refracted by the scattering layer so that the light beams of the lighting module are distributed in a two-stage manner by the optical lens and the scattering layer and are scattered and diverged in different angles and directions evenly and smoothly so as to provide a fully developed lighting effect, thereby enhancing the lighting efficiency of the lighting device.

According to another advantage of the present invention, the cavity of the rotation body has a semi-spherical shape and has a central point matching the light emitting member of the lighting module and intersecting the center line of the rotation body so that the light beams of the lighting module directly pass through the cavity into the rotation body of the optical lens to reduce an optical loss of the lighting module.

According to a further advantage of the present invention, the center line of the rotation body intersects the light emitting member of the lighting module so that the light beams of the lighting module are diffused toward different directions symmetrically.

According to a further advantage of the present invention, the rotation body of the optical lens has a peripheral wall provided with two convex portions to provide proper reflecting and refracting angles so that the light beams of the lighting module are distributed on the optical lens evenly and smoothly.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-9, a lighting device in accordance with the preferred embodiment of the present invention is an electric bulb and comprises an optical lens 3, a scattering layer 4 mounted on an outer surface of the optical lens 3, and a lighting module 5 mounted on the optical lens 3 and emitting a plurality light beams 52 which are reflected and/or refracted by the optical lens 3 and are reflected and/or refracted by the scattering layer 4.

Figure 1:
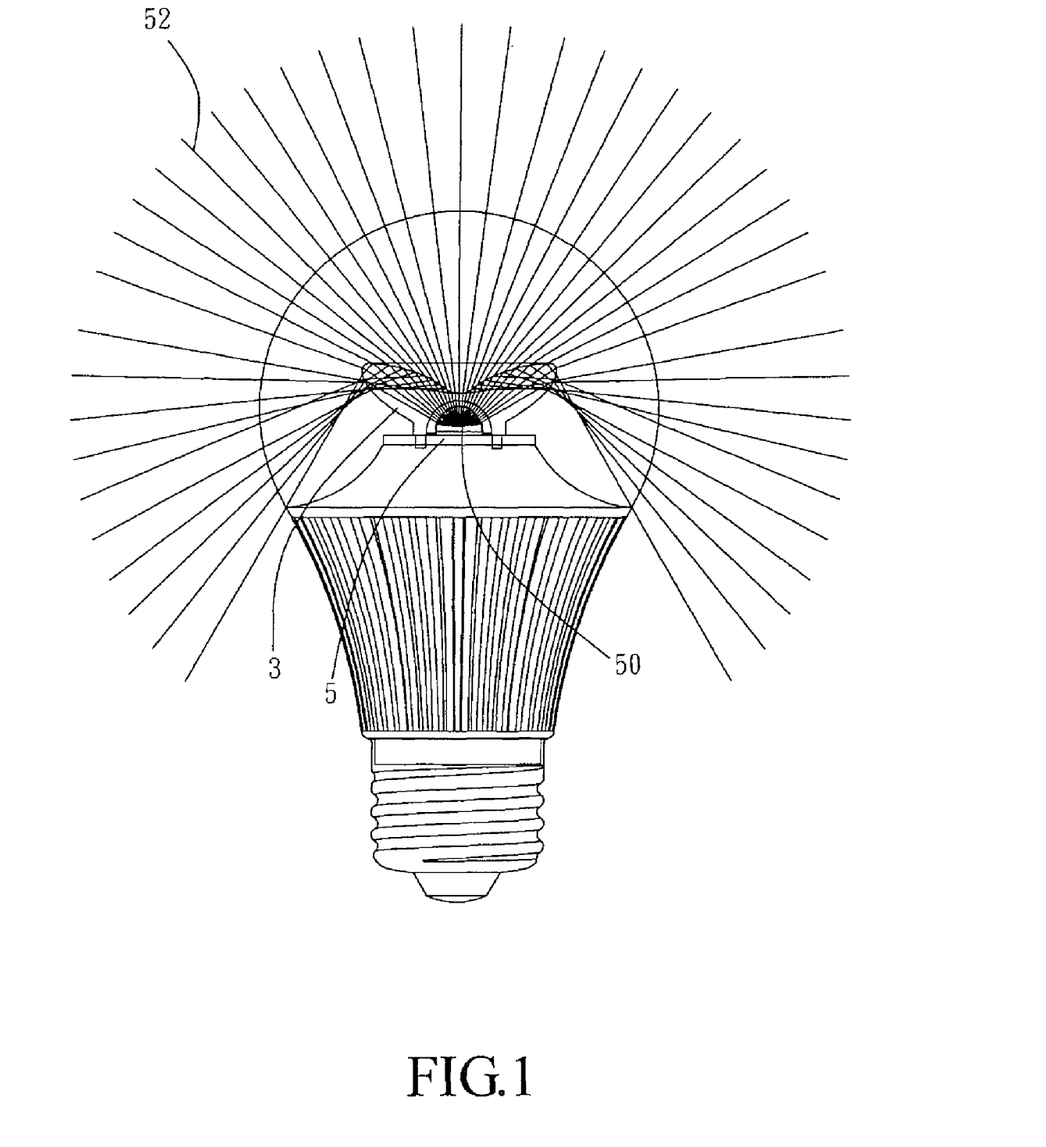
FIG. 1 is a front cross-sectional view of a lighting device in accordance with the preferred embodiment of the present invention.

The lighting module 5 has a side provided with at least one light emitting member 50. Preferably, the lighting module 5 is an LED (light emitting diode) module.

The optical lens 3 is located in front of the lighting module 5 and is disposed between the lighting module 5 and the scattering layer 4. The optical lens 3 is worked specifically so that the optical lens 3 has a curved surface with different curvatures.

Figure 2:
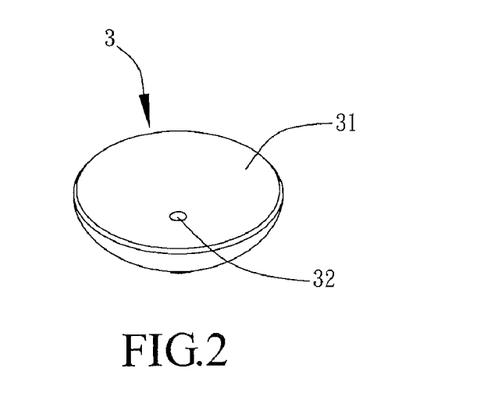
FIG. 2 is a perspective view of an optical lens of the lighting device as shown in FIG. 1.
Figure 3:
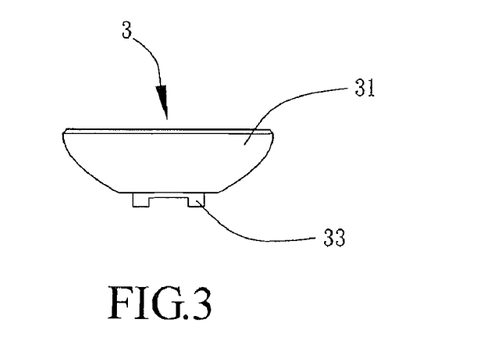
FIG. 3 is a front view of the optical lens of the lighting device as shown in FIG. 2.
Figure 4:
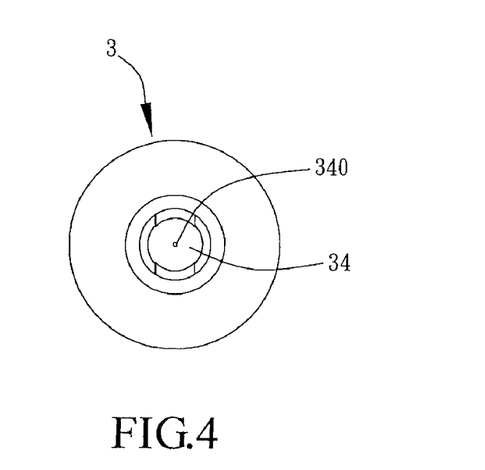
FIG. 4 is a bottom view of the optical lens of the lighting device as shown in FIG. 2.
Figure 5:
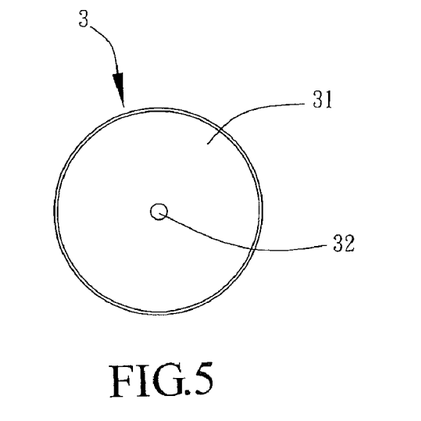
FIG. 5 is a top view of the optical lens of the lighting device as shown in FIG. 2.
Figure 6:
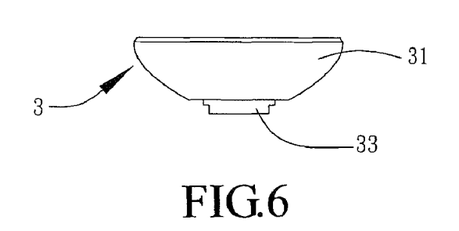
FIG. 6 is a side view of the optical lens of the lighting device as shown in FIG. 2.

In the preferred embodiment of the present invention, the optical lens 3 includes a rotation body 31 and a mounting portion 33 combined with the rotation body 31 and secured to the lighting module 5 to attach the rotation body 31 to the lighting module 5. The optical lens 3 has a substantially bowl shape. The mounting portion 33 of the optical lens 3 is disposed between the rotation body 31 and the lighting module 5.

Figure 7:
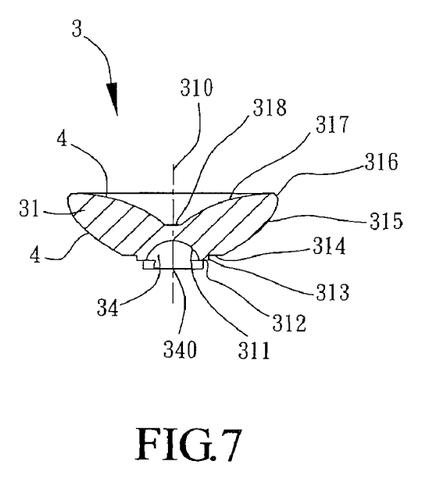
FIG. 7 is a side cross-sectional view of the optical lens of the lighting device as shown in FIG. 2.

The rotation body 31 of the optical lens 3 is used to reflect and refract the light beams 52 of the lighting module 5 so as to scatter and diverge the light beams 52 of the lighting module 5. The rotation body 31 of the optical lens 3 has a bottom formed with at least one cavity 34 to receive the at least one light emitting member 50 of the lighting module 5 and has a top formed with an aperture 32 aligning with and connected to the cavity 34. The rotation body 31 of the optical lens 3 has a center line 310 aligning with the light emitting member 50 of the lighting module 5. The center line 310 of the rotation body 31 is perpendicular to the lighting module 5. The cavity 34 of the rotation body 31 has a substantially semi-spherical shape and has a central point 340 matching the light emitting member 50 of the lighting module 5 and intersecting the center line 310 of the rotation body 31 so that the light beams 52 of the lighting module 5 directly pass through the cavity 34 into the rotation body 31 to reduce an optical loss of the lighting module 5.

As shown in FIG. 7, the rotation body 31 of the optical lens 3 has a rotating surface consisting of multiple optical segments 311, 312, 313, 314, 315, 316, 317 and 318 which have different shapes and are arranged symmetrically about the center line 310 of the rotation body 31 to form a substantially flower petal profile. The rotation body 31 of the optical lens 3 has a recessed upper surface provided with two convex portions 317 which are arranged symmetrically about the center line 310 of the rotation body 31. The rotation body 31 of the optical lens 3 has a recessed lower surface provided with a substantially semi-spherical concave portion 311 whose center intersecting the center line 310 of the rotation body 31. The rotation body 31 of the optical lens 3 has a peripheral wall provided with two convex portions 315 which are arranged symmetrically about the center line 310 of the rotation body 31.

Figure 8:
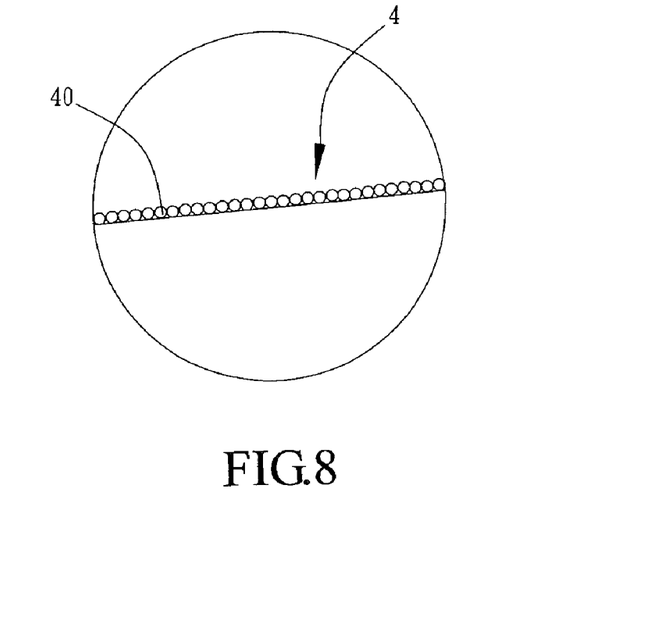
FIG. 8 is a side cross-sectional view of a scattering layer of the lighting device as shown in FIG. 7.
Figure 9:
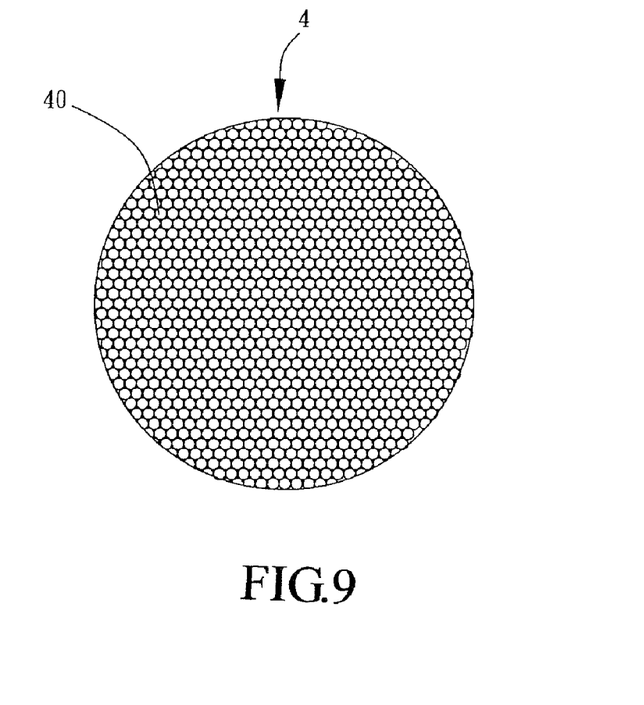
FIG. 9 is a top cross-sectional view of the scattering layer of the lighting device as shown in FIG. 7.

As shown in FIGS. 8 and 9, the scattering layer 4 is made of material with a high light permeability. Preferably, the scattering layer 4 includes a plurality of particles 40 which are plated and juxtaposed to each other. Each of the particles 40 of the scattering layer 4 has a nanometer size, has an irregular shape and has multiple faces. Thus, the particles 40 of the scattering layer 4 are plated on the outer surface of the optical lens 3, so that when the light beams 52 of the lighting module 5 pass through the scattering layer 4, the light beams 52 of the lighting module 5 have different incident angles on the particles 40 of the scattering layer 4 and have different reflection and/or refraction angles the particles 40 of the scattering layer 4 such that the light beams 52 of the lighting module 5 are distributed by the particles 40 of the scattering layer 4 evenly and smoothly in different angles.

In practice, the light beams 52 of the lighting module 5 initially pass through the optical lens 3. Then, the light beams 52 of the lighting module 5 pass through the scattering layer 4. Finally, the light beams 52 of the lighting module 5 emerge from the scattering layer 4.

Thus, when the light beams 52 of the lighting module 5 pass through the optical lens 3, the light beams 52 of the lighting module 5 are reflected and/or refracted by the optical lens 3. At this time, the optical lens 3 has different curvatures, so that the light beams 52 of the lighting module 5 have different incident angles on the optical lens 3 and have different reflection and/or refraction angles on the optical lens 3. In such a manner, after the light beams 52 of the lighting module 5 pass through and emerge from the optical lens 3, the light beams 52 of the lighting module 5 are scattered and diverged in different angles and directions from the optical lens 3 and are distributed by the optical lens 3 evenly and smoothly so that the lighting module 5 has a larger lighting angle.

In addition, when the light beams 52 of the lighting module 5 pass through the scattering layer 4, the light beams 52 of the lighting module 5 are reflected and/or refracted by the particles 40 of the scattering layer 4. At this time, each of the particles 40 of the scattering layer 4 has an irregular shape and has multiple faces, so that the light beams 52 of the lighting module 5 have different incident angles on the scattering layer 4. In such a manner, after the light beams 52 of the lighting module 5 pass through and emerge from the scattering layer 4, the light beams 52 of the lighting module 5 are scattered and diverged in different angles and directions from the scattering layer 4 so that the light beams 52 of the lighting module 5 are distributed by the particles 40 of the scattering layer 4 evenly and smoothly to have a fully developed lighting effect.

Figure 10:
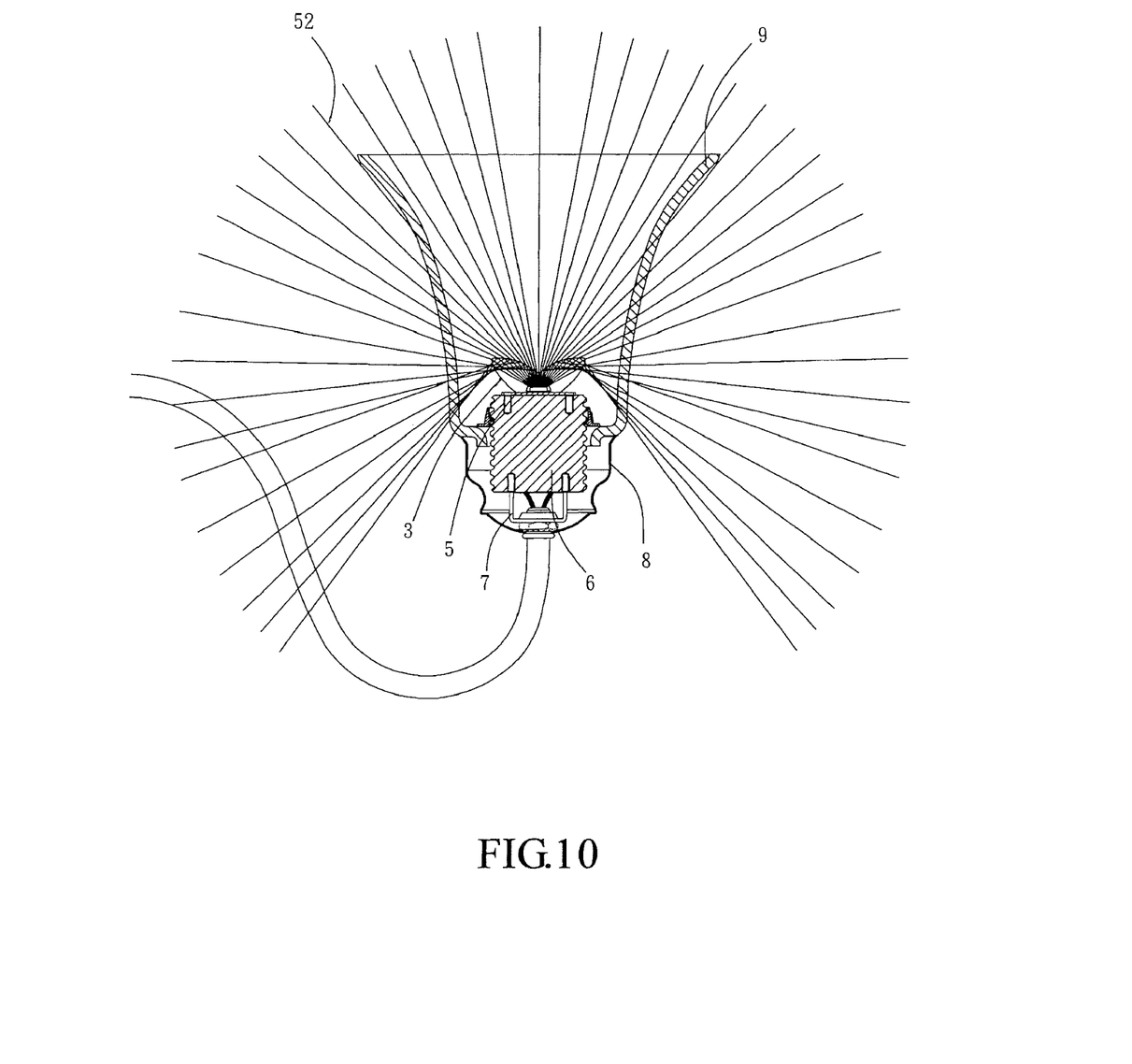
FIG. 10 is a front cross-sectional view of a lighting device in accordance with another preferred embodiment of the present invention.
Figure 11:
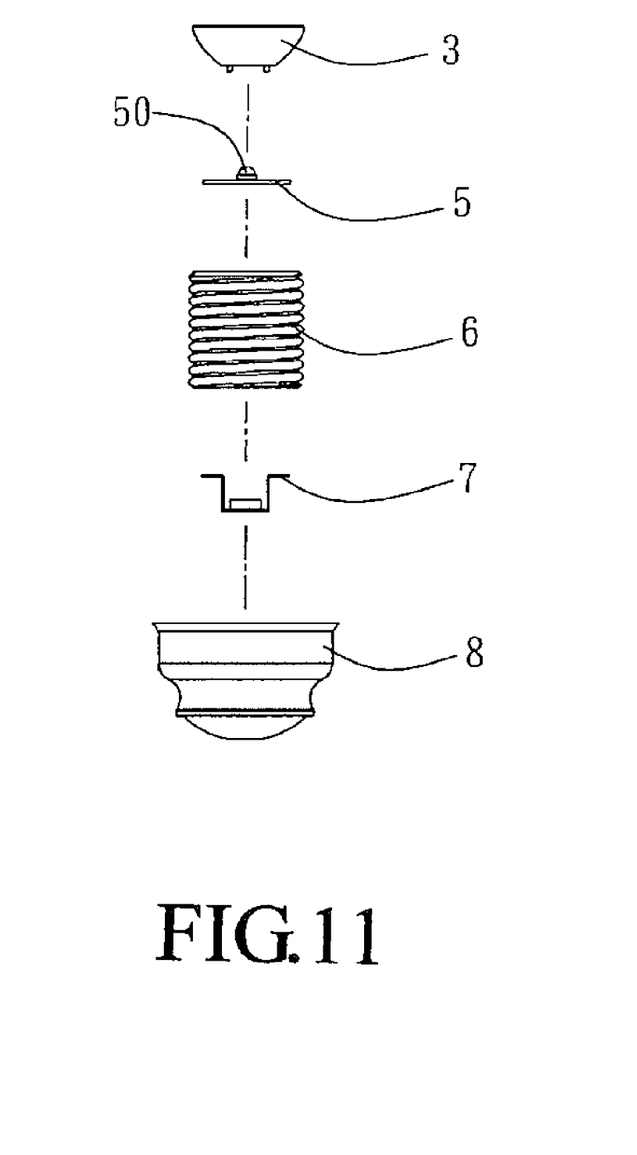
FIG. 11 is a partially front exploded view of the lighting device as shown in FIG. 10.

As shown in FIGS. 10 and 11, the lighting device in accordance with another preferred embodiment of the present invention is a lamp and comprises a transparent lamp shade 9, the optical lens 3 mounted in the lamp shade 9, the lighting module 5 mounted in the lamp shade 9, a heatsink module 6 mounted on the bottom of the lamp shade 9 and abutting the lighting module 5 to provide a heatsink effect to the lighting module 5, a connector 8 connected with the bottom of the lamp shade 9 to receive the heatsink module 6, and a support bracket 7 mounted between the heatsink module 6 and the connector 8 to support the heatsink module 6.

Accordingly, the light beams 52 of the lighting module 5 are initially reflected and/or refracted by the optical lens 3 and are then reflected and/or refracted by the scattering layer 4 so that the light beams 52 of the lighting module 5 are distributed in a two-stage manner by the optical lens 3 and the scattering layer 4 and are scattered and diverged in different angles and directions evenly and smoothly so as to provide a fully developed lighting effect, thereby enhancing the lighting efficiency of the lighting device. In addition, the cavity 34 of the rotation body 31 has a semi-spherical shape and has a central point 340 matching the light emitting member 50 of the lighting module 5 and intersecting the center line 310 of the rotation body 31 so that the light beams 52 of the lighting module 5 directly pass through the cavity 34 into the rotation body 31 of the optical lens 3 to reduce an optical loss of the lighting module 5. Further, the center line 310 of the rotation body 31 intersects the light emitting member 50 of the lighting module 5 so that the light beams 52 of the lighting module 5 are diffused toward different directions symmetrically. Further, the rotation body 31 of the optical lens 3 has a peripheral wall provided with two convex portions 315 to provide proper reflecting and refracting angles so that the light beams 52 of the lighting module 5 are distributed on the optical lens 3 evenly and smoothly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:
1. A lighting device comprising:
an optical lens;
a scattering layer mounted on an outer surface of the optical lens; and
a lighting module mounted on the optical lens and emitting a plurality of light beams which are reflected or refracted by the optical lens and are reflected or refracted by the scattering layer, wherein:
the lighting module has a side provided with at least one light emitting member;
the optical lens includes a rotation body; and the rotation body of the optical lens has a bottom formed with at least one cavity to receive the at least one light emitting member of the lighting module.

2. The lighting device of claim 1, wherein the scattering layer is made of material with a high light permeability.

3. The lighting device of claim 2, wherein the scattering layer includes a plurality of particles which are juxtaposed to each other.

4. The lighting device of claim 3, wherein each of the plurality of particles of the scattering layer has a nanometer size.

5. The lighting device of claim 1, wherein:
the rotation body of the optical lens has a center line aligning with the at least one light emitting member of the lighting module;
the center line of the rotation body is perpendicular to the lighting module; and
the at least one cavity of the rotation body has a substantially semi-spherical shape and has a central point matching the at least one light emitting member of the lighting module and intersecting the center line of the rotation body.

6. The lighting device of claim 1, wherein the optical lens further includes a mounting portion combined with the rotation body and secured to the lighting module to attach the rotation body to the lighting module.

7. The lighting device of claim 1, wherein the rotation body of the optical lens has a top formed with an aperture aligning with and connected to the at least one cavity.

8. The lighting device of claim 1, wherein the rotation body of the optical lens has a rotating surface consisting of multiple optical segments which have different shapes and are arranged symmetrically about the center line of the rotation body to form a substantially flower petal profile.

9. The lighting device of claim 8, wherein the rotation body of the optical lens has a recessed upper surface provided with two convex portions arranged symmetrically about the center line of the rotation body.

10. The lighting device of claim 8, wherein the rotation body of the optical lens has a recessed lower surface provided with a substantially semi-spherical concave portion whose center intersects the center line of the rotation body.

11. The lighting device of claim 8, wherein the rotation body of the optical lens has a peripheral wall provided with two convex portions arranged symmetrically about the center line of the rotation body.

12. The lighting device of claim 1, wherein the optical lens is located in front of the lighting module.

13. The lighting device of claim 12, wherein the optical lens is disposed between the lighting module and the scattering layer.

* * * * *